United States Patent [19]

Tominaga et al.

[11] E Patent Number: Re. 31,994

[45] Reissued Date of Patent: Oct. 1, 1985

[54] INTAKE SYSTEM FOR MOTORCYCLE ENGINES HAVING V-SHAPED CYLINDER ARRANGEMENT

[75] Inventors: Nobuyoshi Tominaga, Hamamatsu; Nobuyoshi Kurai, Iwata; Hagime Ueno; Sadahide Suzuki, both of Shizuoka, all of Japan

[73] Assignee: Yamaha Hatsudoki Kabushiki Kaisha, Iwata, Japan

[21] Appl. No.: 444,862

[22] Filed: Nov. 26, 1982

Related U.S. Patent Documents

Reissue of:

[64] Patent No.: 4,321,978
Issued: Mar. 30, 1982
Appl. No.: 57,268
Filed: Jul. 13, 1979

[30] Foreign Application Priority Data

Jul. 15, 1978 [JP] Japan ..... 53-86401

[51] Int. Cl.[4] ..... B62K 11/08; B62K 19/30

[52] U.S. Cl. ..... 180/225; 55/385 B; 123/55 R; 180/219

[58] Field of Search ..... 180/219, 225; 123/55 R, 123/55 VF, 52 MV, 59 PC, 73 A; 55/DIG. 28, 385 B

[56] References Cited

U.S. PATENT DOCUMENTS

| | | | |
|---|---|---|---|
| 1,386,354 | 8/1921 | Owen | 180/225 |
| 2,329,248 | 9/1943 | Carlson | 180/219 |
| 4,319,657 | 3/1982 | Nomura | 180/219 |

FOREIGN PATENT DOCUMENTS

| | | | |
|---|---|---|---|
| 190403 | 6/1957 | Austria | 180/225 |
| 762952 | 2/1954 | Fed. Rep. of Germany | 180/225 |
| 737327 | 9/1955 | United Kingdom | 55/385 B |

*Primary Examiner*—Joseph F. Peters, Jr.
*Assistant Examiner*—Donn McGiehan
*Attorney, Agent, or Firm*—Harness, Dickey & Pierce

[57] ABSTRACT

A motorcycle engine having a V-shaped cylinder arrangement in which a space is defined between the fore and aft cylinders. Carburetors for the fore and aft cylinder are disposed in the space between the cylinders and an air filter is located behind the engine. The motorcycle has a frame which is formed with an inside cavity connected with the air filter and the carburetors so that the inside cavity constitutes a part of the intake passage.

19 Claims, 6 Drawing Figures

INTAKE SYSTEM FOR MOTORCYCLE ENGINES HAVING V-SHAPED CYLINDER ARRANGEMENT

Matter enclosed in heavy brackets [ ] appears in the original patent but forms no part of this reissue specification; matter printed in italics indicates the additions made by reissue.

The present invention relates to intake systems for motorcycle engines and more particularly to intake systems for motorcycle engines having V-shaped cylinder arrangements.

In a motorcycle having an engine of V-shaped cylinder arrangement, the engine is generally mounted on the frame with the crankshaft oriented transversely with respect to the longitudinal direction of the motorcycle. A space is therefore defined between the fore and aft cylinders and one or more carburetors are disposed in this space. The cylinders are formed with intake ports at the sides facing to the space so as to be connected with the carburetor or carburetors in the space.

In this type of motorcycle, an air filter is disposed behind the engine so that intake passages are provided around the aft cylinder. Thus, it has been quite difficult to accomplish a satisfactory intake passage arrangement. In order to avoid this problem, the air filter may be disposed above the engine. However, the arrangement is also inconvenient since an adequate space cannot be provided therefor due to the existence of a fuel tank or other components.

It is therefore an object of the present invention to provide an intake system for a motorcycle engine having a V-shaped cylinder arrangement, in which the intake passage arrangement is simplified and the intake efficiency can be improved.

Another object of the present invention is to provide an engine intake system which is effective to suppress engine intake noise.

According to the present invention, the above and other objects can be accomplished in combination with a motorcycle comprising a frame, an engine mounted on said frame and including at least one fore cylinder and at least one aft cylinder which are arranged in a V-shaped configuration with a space therebetween, each cylinder having intake port means formed at a side facing to the space, carburetor means disposed in said space and connected with said intake port means in the cylinders, said frame having a closed cavity with at least a portion above the engine, said frame being formed with inlet and outlet port means for the cavity, said outlet port means being connected with said carburetor means so that intake air is passed through the cavity in the frame to the carburetor means, and air filter means for passing therethrough the intake air before it is introduced into the carburetor means.

In a preferable aspect of the present invention, the air filter means is disposed behind the engine and of a box type configuration having a side cover and a back wall which are connected together to constitute a closed box, said back wall being provided with air inlet and outlet ports and supporting an air filter element disposed between the inlet and outlet ports so that air is passed from said inlet port through the air filter element to the outlet port. According to this arrangement, relatively clean air is introduced into the engine from the inboard side of the motocycle. In a more preferable arrangement, the inlet port of the air filter means is associated with an upwardly directed inlet pipe. This arrangement is effective to avoid induction of relatively warm air which has been heated by the engine. Alternatively, the air filter means may be located in the cavity in the frame.

According to a further aspect of the present invention, separate carburetors are provided respectively for the fore and aft cylinders and the carburetors are arranged in transversely aligned or a side-by-side relationship. In this instance, it is preferable to arrange the fore and aft cylinders in positions transversely offset from each other.

The above and other objects and features of the present invention will become apparent from the following descriptions of a preferred embodiment taking reference to the accompanying drawings, in which.

Figure 1:
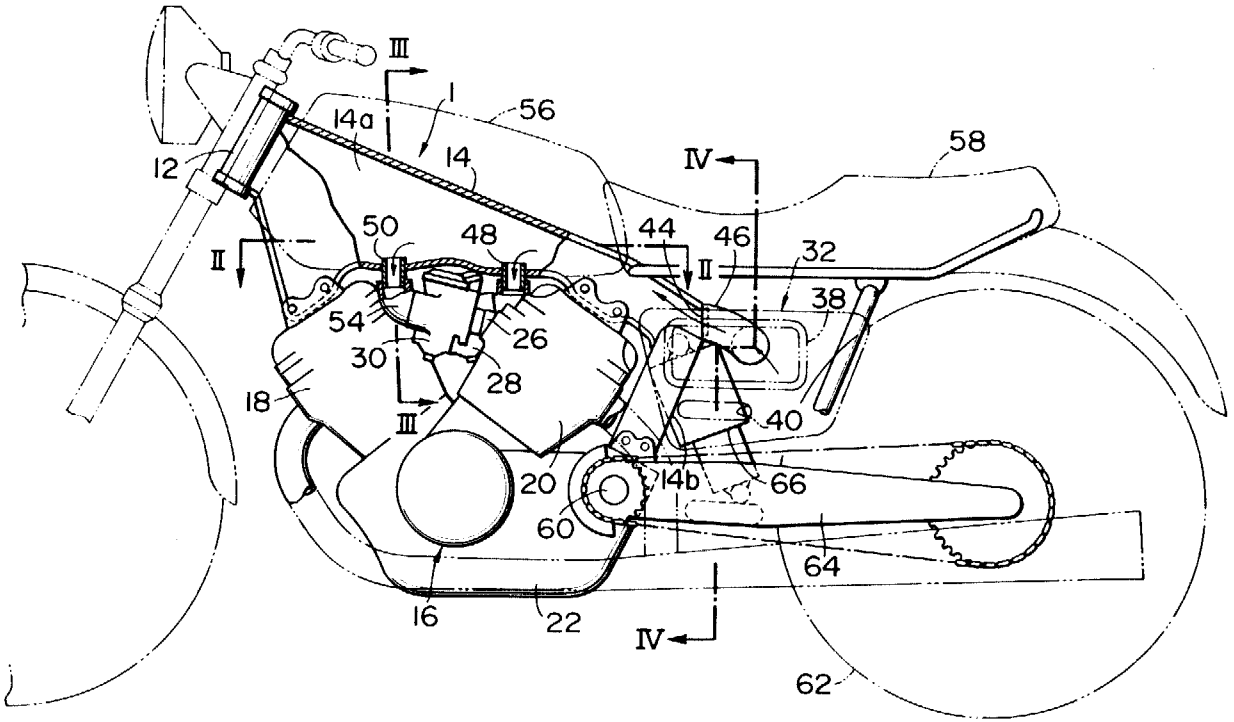
FIG. 1 is a partially cut-away side view of a motorcycle embodying the features of the present invention.

Referring to the drawings, particularly to FIG. 1, the motorcycle shown therein includes a frame 1 comprised of a steering head 12 and a main frame portion 14 which is of a welded structure having an inside cavity 14a therein. An engine 16 which is mounted on the frame 1 is of a V-shaped cylinder arrangement having a force cylinder 18 and an aft cylinder 20 which have a common crankshaft housed in a crankcase 22. To mount the engine 16 on the frame 1, the cylinders 18 and 20 are connected at their top portions to the main frame portion 14 and the crankcase 22 is connected at the rear end portion with a frame member 14b extending downwardly from the rear portion of the main frame portion 14.

Figure 2:
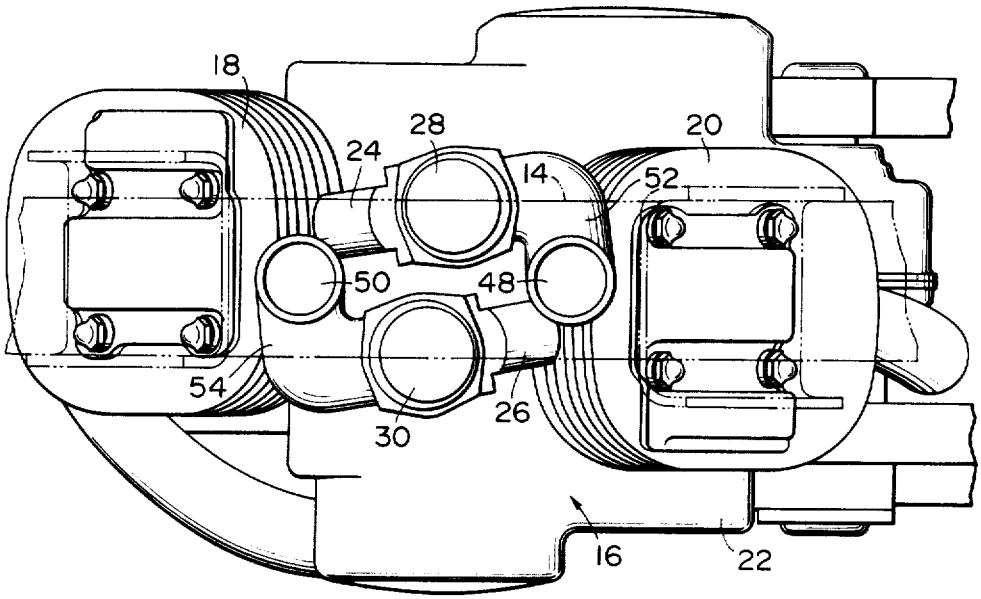
FIG. 2 is a fragmentary view as seen substantially along the line II—II in FIG. 1.

Referring to FIG. 2 in addition to FIG. 1, it will be noted that the cylinders 18 and 20 have intake ports 24 and 26, respectively, which are provided at sides facing to the space between the cylinders 18 and 20. As shown in FIG. 2, the cylinders 18 and 20 are offset one from the other in transverse direction of the motorcyle. Thus, the intake ports 24 and 26 for the cylinders 18 and 20 are also transversely offset from each other. The intake ports 24 and 26 are respectively connected with carburetors 28 and 30 which are arranged in side-by-side relationship.

Figure 4:
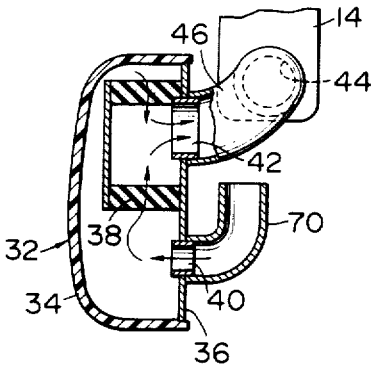
FIG. 4 is a sectional view taken substantially along the line IV—IV in FIG. 1.

As shown in FIGS. 1 and 4, the main frame portion 14 of the frame has a side box or air filter assembly 32 mounted thereon at a side thereof in the vicinity of the rear end of the frame. The side box 32 is constituted by an outer cover 34 which is removably connected with a back wall 36 to provide a closed box. An air filter element 38 is disposed in the box and supported by the back wall 36. As shown in FIG. 4, the air filter 38 is of a cylindrical configuration and the back wall 36 is formed with an air inlet port 40 and an air outlet port 42. The inlet port 40 is located outside the cylinder of the filter element 38 and the inlet port 42 within the cylinder of the filter element 38 so that air from the inlet port 40 is passed through the filter element 38 to the outlet port 42.

Figure 3:
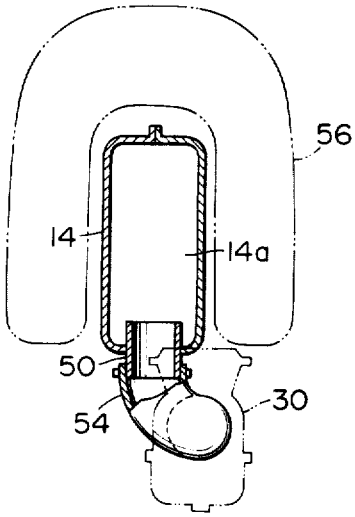
FIG. 3 is a sectional view taken substantially along the line III—III in FIG. 1.

The main frame portion 14 is formed at the rear end portion thereof with an inlet port 44 which is connected through a conduit 46 with the outlet port 42 of the air filter assembly 32. The main frame portion 14 is further formed at the bottom thereof with air outlet ports 48 and 50 so as to face to the space between the fore and aft cylinders 18 and 20. The port 48 is connected as shown in FIGS. 1 and 2 through a conduit 52 with the carburetor 28 leading to the inlet port 24 of the fore cylinder 18. The other port 50 is connected as shown in FIGS. 1, 2 and 3 through a conduit 54 with the carburetor 30 leading to the intake port 26 of the aft cylinder 20.

As shown in FIG. 1, the frame 1 carries a fuel tank 56 and a seat 58. A rear arm 64 is swingably connected at the front end with the crankcase 22 by means of a pivot shaft 60 and a rear wheel 62 is carried on the rear arm 64. A rear cushion 66 is provided between the main frame portion 14 and the rear arm 64.

According to the structures illustrated and described above, the intake air is passed from the air filter assembly 32 to the inside cavity 14a of the main frame portion 14 and then through the carburetors 28 and 30 respectively to the cylinders 18 and 20. It is preferably to have the inlet port 40 of the air filter assembly 32 connected with an upwardly directed inlet pipe 70 as shown in FIG. 4 because in this arrangement it is possible to prevent warm air heated by the cylinders from entering the engine. The intake passage arrangement can therefore be simplified and it is no longer necessary to provide intake passages around the aft cylinder. Since the cavity in the main frame portion is of a substantial volume, it is possible to attenuate the intake noise. The air filter assembly in the illustrated embodiment is further advantageous in that the side box is effectively utilized to constitute the air filter. The transverse offset arrangement of the cylinders and the side-by-side arrangement of the carburetors provide a compact layout of the components. The intake system in accordance with the present invention is further advantageous in that substantially the same or symmetrical intake passages are provided for the fore and aft cylinders so that intake flow resistances for the fore and aft cylinders become substantially the same and uniform or balanced mixture flow can be ensured for the both cylinders.

Figure 5:
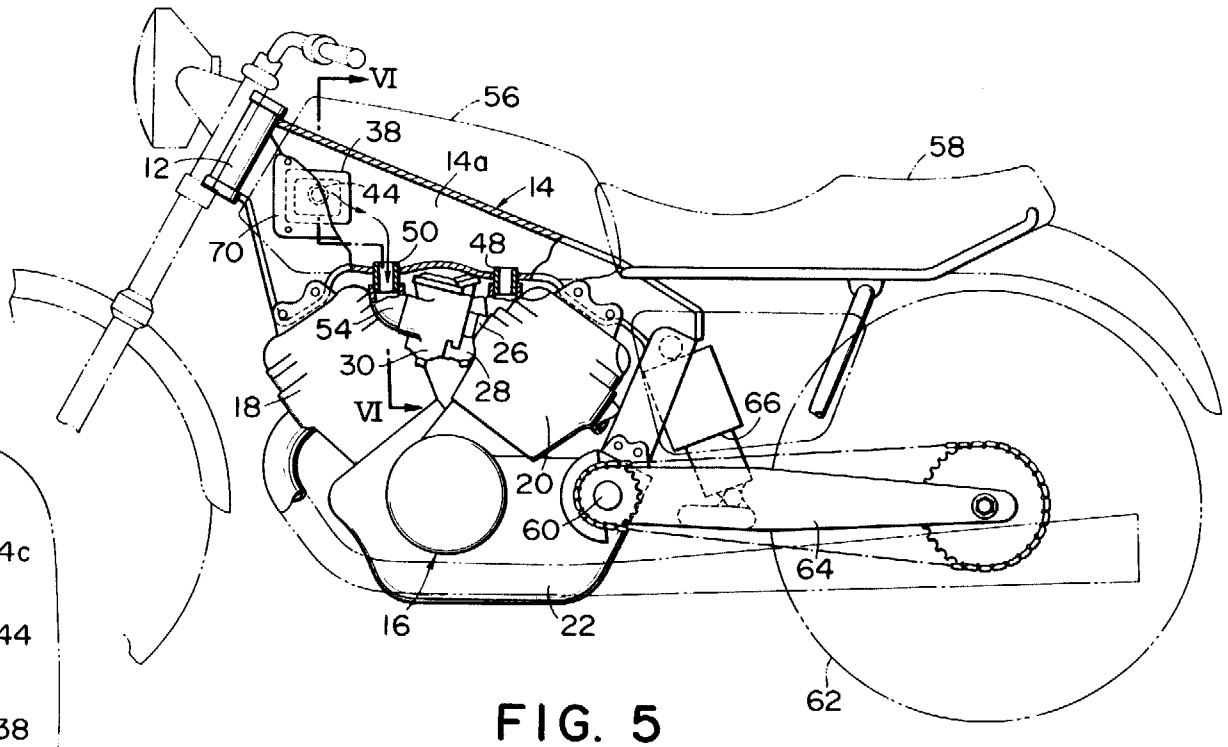
FIG. 5 is a view similar to FIG. 1 but showing another embodiment.
Figure 6:
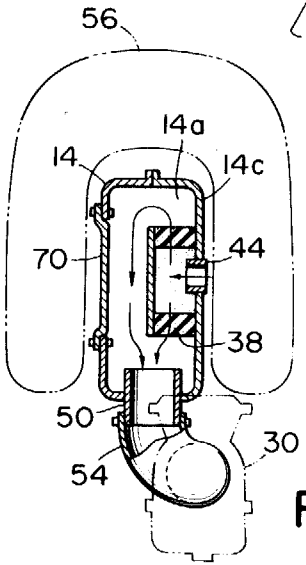
FIG. 6 is a sectional view taken along the line VI—VI in FIG. 5.

Referring to FIGS. 5 and 6, there is shown an alternative embodiment of the present invention. Since the basic structure of the motorcycle in this embodiment is the same as in the previous embodiment, corresponding parts are shown by the same reference numerals. In this embodiment, the main frame portion 14 has a side wall 14c wherein an inlet port 44 if formed. On the inner surface of the side wall 14b, there is mounted an air filter element 38 which surrounds the inlet port 44. At the other side of the main frame portion 14, there is formed an opening which facilitate installation of the filter element 38. A cover 70 is provided to close the opening. Thus, in this embodiment, the air filter element 38 is mounted within the cavity and intake air is passed from the inlet port 44 through the air filter element 38 as shown by arrows in the drawings.

The invention has thus been shown and described with reference to a specific embodiment, however, it should be noted that the invention is in no way limited to the details of the illustrated structures but changes and modifications may be made without departing from the scope of the appended claims.

We claim:

1. A motorcycle comprising a frame, an engine mounted on said frame and including at least one fore cylinder and at least one aft cylinder which are arranged in a V-shaped configuration with a laterally-extending space therebetween, each cylinder having intake port means formed at a side facing into said space, carburetor means disposed in said space and connected with said intake port means in the cylinders, said frame having a closed cavity at least at a portion which is located above the engine, said frame being formed with inlet and outlet port means respectively leading into and out of the cavity, said outlet port means being connected with said carburetor means so that intake air is passed through the cavity in the frame to the carburetor means, and air filter means for passing therethrough the intake air before it is introduced into the closed cavity, said air filter means being disposed behind the engine and mounted on the frame and said inlet port means of the frame is connected with said air filter means so that the intake air is passed from the air filter means through the cavity in the frame to the carburetor means, said air filter means being of a box type configuration having a side cover and a back wall which are connected together to constitute a closed box, said back wall being provided with air inlet and outlet ports and supporting an air filter element disposed between the inlet and outlet ports so that air is passed from said inlet port through the air filter element to the outlet port.

2. A motorcycle in accordance with claim 1 in which said inlet port of the air filter means is associated with an upwardly directed inlet pipe so as to avoid induction of warm air which has been heated by the engine.

3. A motorcycle in accordance with claim 1 in which separate carburetors are provided respectively for the fore and aft cylinders and the carburetors are arranged in a side-by-side relationship.

4. A motorcycle in accordance with claim 3 in which the fore and aft cylinders are transversely offset with each other.

5. A motorcycle according to claim 1 in which said closed cavity is spaced from said cylinders to avoid heating of air in said cavity by said cylinders.

6. A motorcycle comprising; a frame, an engine mounted on said frame and including at least one fore cylinder and at least one aft cylinder which are arranged in a V-shaped configuration with a laterally-extending space therebetween, each cylinder having intake port means formed at a side facing into space, a pair of independent carburetor means, one respective to a fore and one to an aft cylinder, disposed in said space and independently connected with a respective one of said intake port means of a respective one of said cylinders, said frame having a closed cavity at least at a portion which is located above the engine, said frame being formed with inlet port means leading into said cavity, and a pair of outlet port means, each said outlet port means being connected with a respective one of said carburetor means so that intake air is passed through the cavity in the frame to said outlet means, and independently to each of said carburetor means, and air filter means for passing therethrough the intake air before it is introduced into the closed cavity, said aft cylinder having an intake passage extending forwardly through said carburetor means and connected with said cavity at a front portion thereof, said fore cylinder having an intake passage extending rearwardly through said carburetor means and connected with said cavity at a rear portion thereof.

7. A motorcycle in accordance with claim 6 in which said air filter means is disposed behind the engine and mounted on the frame, and said inlet port means of the frame is connected with said air filter means so that the intake air is passed from the air filter means through the cavity to the carburetor means, said air filter being of a box type configuration having a side cover and a back wall which are connected together to constitute a closed box, said back wall being provided with air inlet and outlet ports and supporting an air filter element disposed between the inlet and outlet ports so that air is passed from said inlet port through the air filter element to the outlet port.

8. A motorcycle in accordance with claim 7 in which said inlet port of the air filter means is associated with an upwardly directed inlet pipe so as to avoid induction of warm air which has been heated by the engine.

*9. A motorcycle comprising a frame, an engine mounted on said frame with its crankshaft extending transversely to said frame and including at least one fore cylinder and at least one aft cylinder which are arranged in a V-shaped configuration with a laterally-extending space therebetween, each cylinder having intake port means formed at a side facing into said space, charge forming means disposed contiguous to said space and connected with said intake port means of said cylinders, a closed cavity at least at a portion which is located above the engine and in juxtaposition to said space, said cavity being formed with inlet and outlet port means respectively leading into and out of the cavity, said outlet port means being connected with said charge forming means so that intake air is passed through the cavity to said charge forming means, and air filter means for passing therethrough intake air before it is introduced into the closed cavity through said inlet port, said air filter means comprising an air filter chamber having an intake and an outlet in communication with said cavity inlet port and an air filter element disposed between said intake and said outlet for filtering air before delivery to said cavity.*

*10. A motorcycle as set forth in claim 9 further including a fuel tank carried by the frame and extending above the engine, said cavity being juxtaposed to said fuel tank.*

*11. A motorcycle as set forth in claim 10 wherein the fuel tank is saddle shaped and the cavity extends at least in part into the area defined by the saddle.*

*12. A motorcycle as set forth in claim 11 wherein the air filter element is removable without removing any component of the induction system other than the air filter element and a portion of the housing surrounding it.*

*13. A motorcycle as set forth in claim 10 wherein the air filter intake is associated with an upwardly directly intake pipe so as to avoid induction of warm air which has been heated by said engine.*

*14. A motorcycle as set forth in claim 10 wherein the air filter chamber is disposed at a side of the closed cavity.*

*15. A motorcycle comprising: a frame, an engine mounted on said frame with its crankshaft extending transversely to said frame and including at least one fore cylinder and at least one aft cylinder which are arranged in a V-shaped configuration with a laterally-extending space therebetween, each cylinder having intake port means formed at a side facing into said space, a pair of charge forming means disposed contiguous to said space and each being associated with a respective one of said intake port means of a respective one of said cylinders, a closed cavity at least at a portion which is located above the engine and contiguous to said space, inlet port means leading into said cavity, and a pair of outlet port means, each said outlet port means being connected with a respective one of said charge forming means so that intake air is passed through the cavity to said outlet port means, and independently to each of said charge forming means, and air filter means for passing therethrough the intake air before it is introduced into the closed cavity, said aft cylinder having an intake passage extending forwardly through said charge forming means and connected with said cavity at a front portion thereof, said fore cylinder having an intake passage extending rearwardly through said charge forming means and connected with said cavity at a rear portion thereof.*

*16. A motorcycle as set forth in claim 15 further including a fuel tank carried by the frame and extending above the engine, said space being juxtaposed to said fuel tank.*

*17. A motorcycle as set forth in claim 16 wherein the fuel tank is saddle shaped and the space extends at least in part into the area defined by the saddle.*

*18. A motorcycle as set forth in claim 17 wherein the air filter element is removable without removing any component of the induction system other than the air filter element and a portion of the housing surrounding it.*

*19. A motorcycle as set forth in claim 18 wherein the air filter chamber is disposed at a side of the closed cavity.*

* * * * *